(12) United States Patent
Kato

(10) Patent No.: US 6,529,278 B2
(45) Date of Patent: Mar. 4, 2003

(54) OPTICAL INTERFERENCE APPARATUS AND POSITION DETECTION APPARATUS

(75) Inventor: Shigeki Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 09/747,960

(22) Filed: Dec. 27, 2000

(65) Prior Publication Data

US 2002/0163647 A1 Nov. 7, 2002

(30) Foreign Application Priority Data

Dec. 27, 1999 (JP) .............................. 11-369379
Dec. 22, 2000 (JP) ........................ 2000-391425

(51) Int. Cl.$^7$ .............................................. G01B 11/00
(52) U.S. Cl. ...................... 356/498; 356/511
(58) Field of Search ................. 356/498, 511, 356/491, 492, 493, 450

(56) References Cited

U.S. PATENT DOCUMENTS

| 5,502,466 A | | 3/1996 | Kato et al. |
| 5,734,471 A | * | 3/1998 | Nakata ........................ 356/498 |
| 5,737,070 A | | 4/1998 | Kato |
| 5,737,116 A | | 4/1998 | Kadowaki et al. |
| 5,754,282 A | | 5/1998 | Kato et al. |
| 5,796,470 A | | 8/1998 | Ueda et al. |
| 5,815,267 A | | 9/1998 | Kato et al. |
| 5,880,838 A | * | 3/1999 | Marx et al. .............. 250/237 G |
| 5,926,276 A | | 7/1999 | Takamiya et al. |
| 6,134,003 A | * | 10/2000 | Tearney et al. ............. 356/450 |
| 6,195,168 B1 | * | 2/2001 | De Lega et al. ............ 356/497 |
| 6,204,925 B1 | * | 3/2001 | Prikryl et al. ............... 356/498 |
| 6,317,200 B1 | * | 11/2001 | Wang et al. ............ 250/214 B |

* cited by examiner

Primary Examiner—Robert H. Kim
Assistant Examiner—Hoon K. Song
(74) Attorney, Agent, or Firm—Fitzpatrick, Cella, Harper & Scinto

(57) ABSTRACT

An optical interference apparatus includes a light source, a beam splitter for splitting a light beam from the light source, a reference surface by which one split light beam from the beam splitter is reflected to propagate backward through the optical path. The light beam from the reference surface and the other split light beam (which emerges from the beam splitter, is reflected by an object to be detected, and returns) are combined by the beam splitter, and the combined light is used as interference light. The two split light beams emerge from the beam splitter as convergent light. An optical element has a function of converging a light beam or changing a divergent state of the light beam, and is inserted in an optical path of one of the split light beams emerging from the beam splitter. The convergent, reflected light beams are combined as spherical waves with curvature equal to each other owing to an effect of the optical element.

16 Claims, 3 Drawing Sheets

OPTICAL INTERFERENCE APPARATUS AND POSITION DETECTION APPARATUS

BACKGROUND OF THE INVENTION

1. Field of the Invention

The present invention relates to an optical interference apparatus and position detection apparatus which detect variations in the position of an object in a noncontact state.

2. Related Background Art

FIG. 1 is a view showing the arrangement of an interferometer using a conventional semiconductor laser light source. An optical head 1 includes a semiconductor laser light source 2, a condenser lens 3, an unpolarizing beam splitter 4, and a probe-type polarizing member 5 made of glass and protruding from the optical head 1. The condenser lens 3, unpolarizing beam splitter 4, and probe-type polarizing member 5 are sequentially arranged on the optical path of the optical head 1. The probe-type polarizing member 5 has an inclined split surface 5a and a reflecting surface 5b formed in the transmitting direction of the split surface 5a. An object T to be detected is positioned in the reflecting direction of the split surface 5a. A polarizing plate 6 and sensor 7 are arranged in the reflecting direction of the unpolarizing beam splitter 4 in the optical head 1.

A laser beam L1 emitted from the semiconductor laser light source 2 is transmitted through the condenser lens 3 and unpolarizing beam splitter 4 and incident on the probe-type polarizing member 5. This light beam is split into P and S waves at the split surface 5a of the probe-type polarizing member 5. A light beam L2 transmitted through the split surface 5a is reflected as a reference beam by the reflecting surface 5b and returns to the initial optical path. Meanwhile, a light beam L3 reflected by the split surface 5a converges as a measurement beam onto the object T and is scattered/reflected by the rough surface of the object T. This light returns as scattered light to the initial optical path. The reference beam L2 and measurement beam L3 are reflected by the unpolarizing beam splitter 4 toward the sensor 7.

Each of the reference beam L2 and measurement beam L3 is linearly polarized light having planes of polarization that are perpendicular to each other. When the object T relatively moves in the optical axis direction, each light beam becomes rotating circularly polarized light. When these rotating circularly polarized light beams are incident on the polarizing plate 6, an optical interference signal with variations in intensity can be obtained. In this case, since the converging point of the measurement beam L3 on the object T is equal in wave-optics optical path length to the reflecting surface 6b by which the reference beam L2 is reflected, a maximum interference signal can be obtained on the sensor 7.

Letting $\lambda$ be the wavelength of a laser beam from the semiconductor laser light source 2, a sine wave output having one period with $\lambda/2$ is obtained as the object T moves. More specifically, if $\lambda=780$ nm, the sensor 7 outputs a sine wave signal with $780/2=390$ nm. When this signal is electrically divided by 1,000, a high resolution of 0.39 nm can be obtained.

Since the probe-type polarizing member 5 has a narrow structure with a small diameter, the probe-type polarizing member 5 need only protrude from the optical head 1. Even if, therefore, the object T is located in a mechanically complicated portion, measurement can be easily performed by inserting only the probe-type polarizing member 5. In addition, since the reference beam L2 is reflected by the reflecting surface 5b of the probe-type polarizing member 5, this optical path is not exposed to the air. This structure is therefore robust against environmental changes. Furthermore, since the optical system is configured to focus a light beam into a small spot at a position where a maximum coherence is obtained, even if the object T has a considerably rough surface, the surface can be handled as a mirror surface. That is, no restrictions are imposed on the objects to be measured.

In the prior art described above, after the light beam L1 is split by the split surface 5a, the reference beam L2 is transmitted through the glass and reflected by the reflecting surface 5b, and the measurement beam L3 is transmitted through the glass and air and reflected by the surface of the object T. For this reason, the geometrical-optics optical path length differs from the wave-optics optical path length. That is, the reference beam L2 and measurement beam L3 differ in the distances to the central positions of spherical waves. As a consequence, a concentric interference pattern P like the one shown in FIG. 2 is generated at the position of the sensor 7.

To obtain a high-contrast electrical signal from the sensor 7, an aperture 8 aiming at the center of the concentric interference pattern P in FIG. 2 is required. As the measurement beam L3, a convergent light beam is used to facilitate measuring the rough surface of the object T. However, the amount of light reflected by the rough surface toward the sensor 7 is small. In addition, since the aperture 8 aims at the center of the concentric interference pattern P, a light loss occurs, resulting in a decrease in S/N ratio. As a consequence, a sufficient precision cannot be ensured upon electrically dividing a signal to increase the resolution.

SUMMARY OF THE INVENTION

The present invention has been made to solve the above problem, and has as its object to provide an optical interference apparatus and position detection apparatus which can obtain a signal with a high S/N ratio and improve measurement precision.

The above and other objects, features, and advantages of the present invention will be apparent from the following detailed description in conjunction with the accompanying drawings and the appended claims.

DETAILED DESCRIPTION OF THE PREFERRED EMBODIMENTS

The present invention will be described in detail on the basis of the embodiment shown in FIG. 3.

Figure 1:
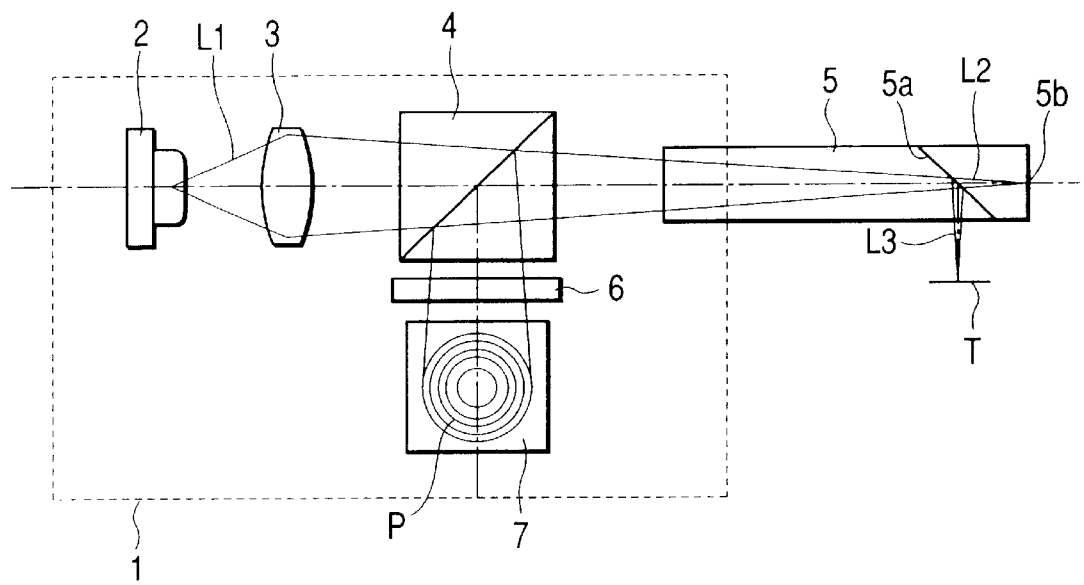
FIG. 1 is a view showing the arrangement of a conventional interferometer.
Figure 2:
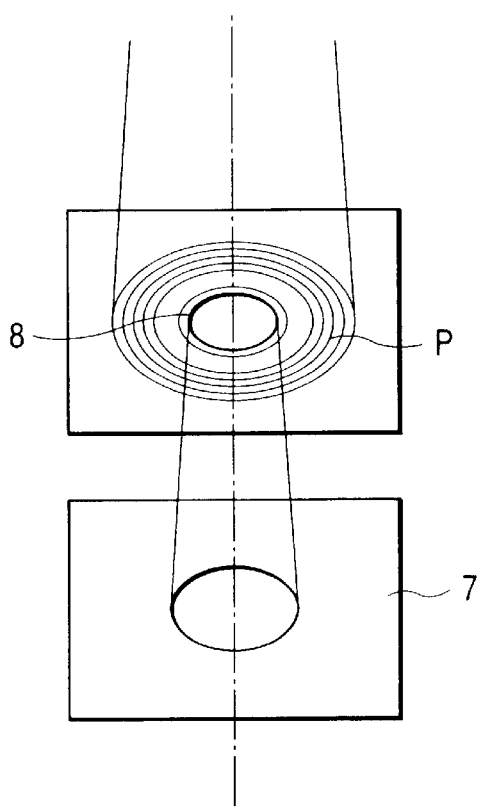
FIG. 2 is a view for explaining a aperture for restricting a concentric interference pattern.
Figure 3:
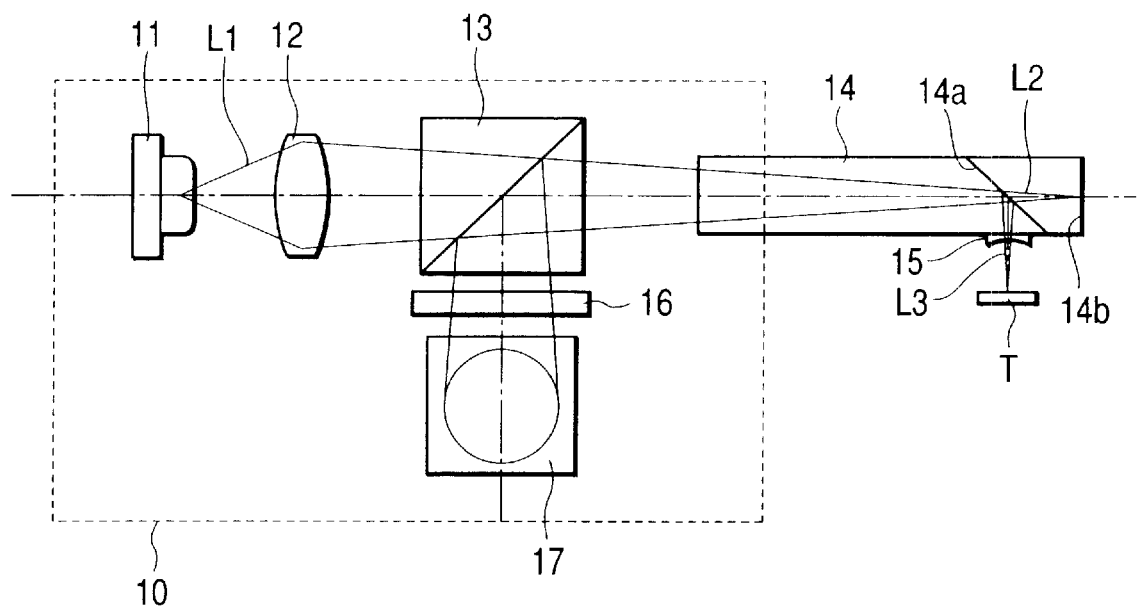
FIG. 3 is a view showing the arrangement of an interferometer according to an embodiment of the present invention.

FIG. 3 is a view showing the arrangement of a compact interferometer using a semiconductor laser light source. An optical head 10 includes a semiconductor laser light source 11, a condenser lens 12, an unpolarizing beam splitter 13, and a probe-type polarizing member 14 made of glass and protruding from the optical head 10. The condenser lens 12, unpolarizing beam splitter 13, and probe-type polarizing member 14 are sequentially arranged on the optical path of the optical head 10. The probe-type polarizing member 14 has a split surface 14a and reflecting surface 14b. The split surface 14a is inclined to split a wave into P and S waves. The reflecting surface 14b totally reflects a light beam transmitted through the split surface 14a. A concave lens 15 is bonded to the incident/exit port of the probe-type polarizing member 14 which is located in the reflecting direction of the split surface 14a. An object T to be detected is positioned to face the concave lens 15. A polarizing plate 16 and sensor 17 are arranged on the optical path of the unpolarizing beam splitter 13 in the optical head 10 in the reflecting direction.

A laser beam L1 emitted from the semiconductor laser light source 11 is converged by the condenser lens 12, transmitted through the unpolarizing beam splitter 13, and incident on the probe-type polarizing member 14. The laser beam L1 is then split into P and S waves by the split surface 14a. One light beam becomes a reference beam L2, which is transmitted through the split surface 14a of the probe-type polarizing member 14 and reflected by the reflecting surface 14b. In this case, the converging point of the reference beam L2 is set on the reflecting surface 14b.

The other light beam reflected by the polarizing beam split surface 14a reaches, as a measurement beam L3, the reflecting surface of the object T. This measurement beam L3 is converged on the reflecting surface of the object T by the concave lens 15 immediately after it emerges from the probe-type polarizing member 14. The refracting power of the concave lens 15 is set such that the converging point of the measurement beam L3 is equal in wave-optics optical path length to the reflecting surface 14b by which the reference beam L2 is reflected. This makes it possible to optimize the interferometer using the semiconductor laser light source 11.

The reference beam L2 and measurement beam L3 are respectively reflected by the reflecting surface 14b and the surface of the object T, and then return to the initial optical path. These beams are reflected by the unpolarizing beam splitter 13 to propagate toward the sensor 17 via the polarizing plate 16. The reference beam L2 and measurement beam L3 are linearly polarized lights having polarization planes orthogonal to each other. When the object T relatively moves in the optical axis direction, each light beam becomes rotating circularly polarized light. When these rotating circularly polarized light beams are incident on the polarizing plate 16, an optical interference signal with variations in intensity can be obtained.

As in the prior art, if the wavelength of a laser beam from the semiconductor laser light source 11 is represented by $\lambda$=780 nm, a sine wave signal of 780/2=390 nm is output from the sensor 17. When this signal is electrically divided by 1,000, a resolution of 0.39 nm is obtained.

Unlike in the conventional interferometer, in the interferometer of this embodiment, positions corresponding to equal optical path length in wave-optics of the reference beam L2 and measurement beam L3 can be set to coincide with the geometrical-optics converging points by use of the concave lens 15. When, therefore, the object T is located at the converging position of the measurement beam L3, the wavefronts of combined light beams become spherical waves with curvatures equal to each other, and an interference signal on the sensor 17 is set in a one-color state without any fringe pattern. In this case, even if the position of the object T is slightly displaced from the converging position, the one-color state remains almost unchanged.

Unlike the prior art, therefore, the diameter of a light beam need not be restricted by an aperture or the like. This makes it possible to prevent a light loss. For example, in the conventional interferometer, if the diameter of an optical interference pattern formed on the sensor 17 is 2 mm, and the diameter of the aperture is 0.5 mm, the light loss is 93.75%. By using the concave lens 15, therefore, the light amount increases by 16 times that in the conventional interferometer.

In a measurement range corresponding to a coherence length of 100 $\mu$m, a concentric interference pattern is produced on the sensor 17 more or less. Even if a light beam is cut to 70% its diameter using an aperture in consideration of this, the light loss can be suppressed to ½. That is, an increase in signal intensity by eight times that in the conventional interferometer can be expected. This increases the S/N ratio, and hence improves the precision in electrical dividing, thus realizing high-precision measurement.

Note that the same effect as that described can be obtained even by replacing the concave lens 15 with a Fresnel lens having a negative refracting power placed at the same position. This Fresnel lens facilitates constructing a low-profile structure, and hence is suited for a compact interferometer.

Figure 4:
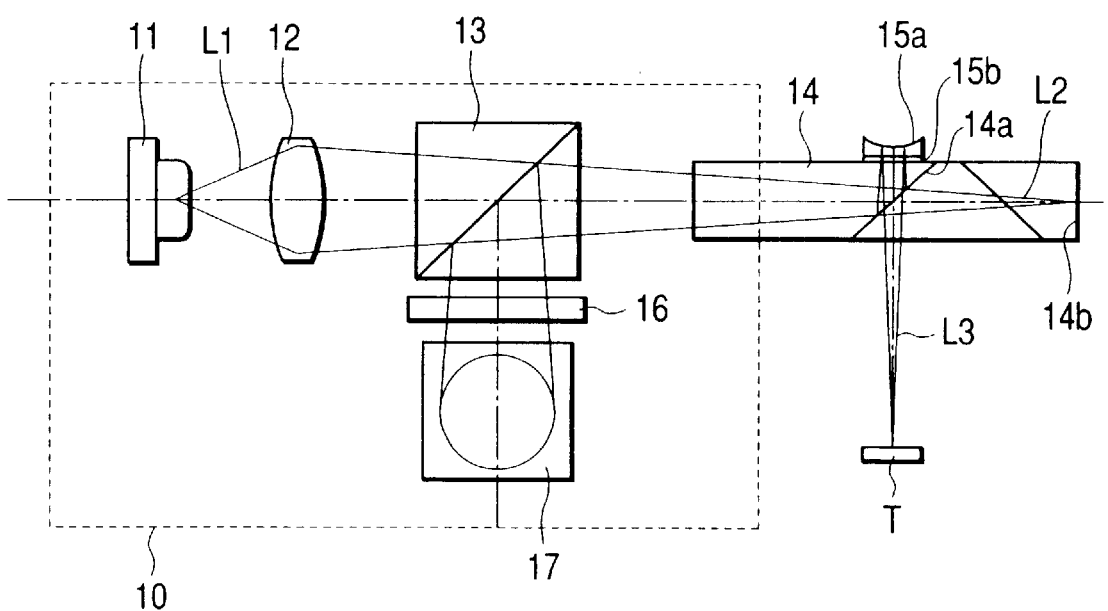
FIG. 4 is a view showing the arrangement of an interferometer according to another embodiment of the present invention.

FIG. 4 shows another embodiment of the present invention.

This embodiment differs from the embodiment shown in FIG. 3 in the following points. A convex mirror 15a is used in place of the concave lens. For this reason, the reflecting direction of a split surface 14a is reversed, and a ¼ wave plate 15b is added in the optical path of a two-way trip. Other points are the same as those in the embodiment shown in FIG. 3, and hence a description thereof except for the different points will be omitted.

The converging position of an S wave reflected by the split surface 14a is moved forward by the convex mirror 15a, and is converted into a P wave by the ¼ wave plate 15b while it reciprocates through the optical path after being reflected by the convex mirror 15a. The P wave is then transmitted through the split surface 14a and propagates toward an object T. The light reflected by the object T propagates backward through the optical path and is combined with a reference beam L2 by the split surface 14a. As in the above embodiment, when the object T is at the converging position of the measurement beam L3, the wavefront of combined light beams become spherical waves with curvatures equal to each other.

As compared with the preceding embodiment using the concave lens, this embodiment is resilient to variations in wavelength because the converging position does not change with a change in wavelength.

The present invention can be effectively applied to an apparatus using a low-coherence light source such as an LED other than a semiconductor laser light source, in particular.

As described above, a measurement light beam and reference light beam are converged into a convergent light beam at a wave-optics equal optical path position. An optical member having a refracting power is placed at a position immediately after the emergence of the light beam from, for example, a probe-type polarizing member, thereby matching the maximum coherence position with the geometrical-optics converging position. Therefore, an optical interference signal on the sensor can be set in a one-color state without any fringe pattern. This makes it possible to eliminate the necessity to use any aperture at the sensor portion, obtain a signal with a high S/N ratio, and improve the measurement precision without causing any light loss.

Figure 5:
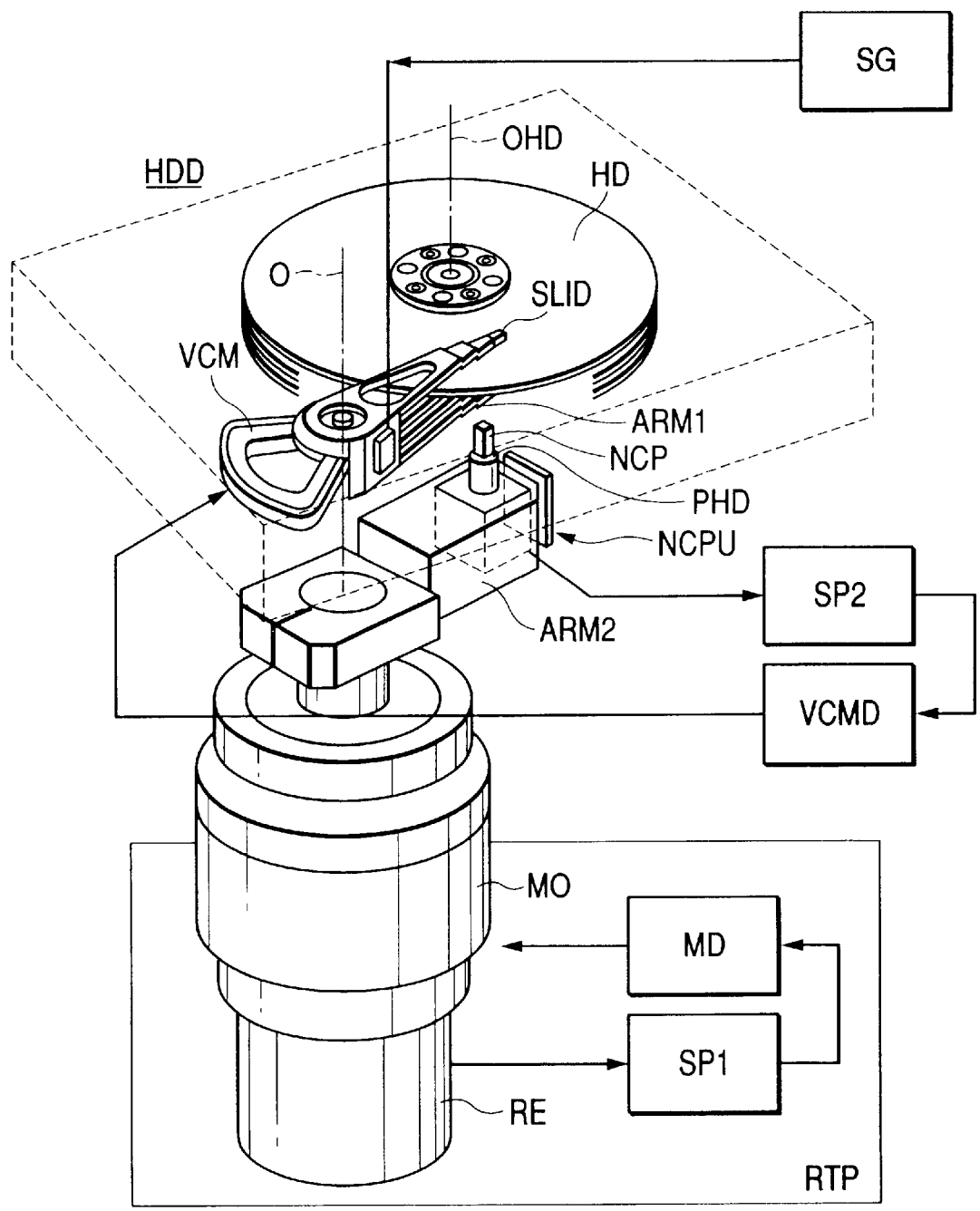
FIG. 5 is a view showing the schematic arrangement of a servo track signal writing apparatus according to an embodiment of the invention.

FIG. 5 is a view showing the schematic arrangement of an embodiment of a servo track signal writing apparatus (servo signal writing apparatus) using the interference apparatus of the present invention and a position detection apparatus using the interference apparatus.

Referring to FIG. 5, this embodiment includes a hard disk drive unit HDD, a hard disk HD, a slider SLID, a magnetic head arm ARM1, a voice coil motor VCM, a spindle (rotation center) OHD of the hard disk HD, and a rotating shaft O of the magnetic head arm ARM1.

A magnetic recording medium is deposited on the surface of the hard disk HD. The hard disk HD always rotates about the spindle OHD at a high speed. A magnetic head is placed near the surface of the hard disk HD. The magnetic head is incorporated in a substantially rectangular parallelepiped portion called the slider SLID mounted on the distal end of the magnetic head arm ARM1 having the rotation center O outside the hard disk HD. By rotating/driving the magnetic head arm ARM1 using the voice coil motor VCM, the magnetic head can be relatively moved on the hard disk HD in a substantially radial direction.

With this operation, magnetic information can be written/read at an arbitrary position (track) on the surface of a disk-like hard disk by the rotating hard disk HD and the magnetic head that moves along an arc.

In the hard disk drive unit HDD, the magnetic head arm ARM1 having the rotating shaft O is mounted outside the hard disk HD. The slider SLID mounted on the distal end of the magnetic head arm ARM1 faces the hard disk surface with a gap of 0.5 μm (or less), and moves along an arc upon rotation of the magnetic head arm ARM1. This arm is rotated by flowing a current in the voice coil motor VCM.

These devices are arranged at spatially proper positions with respect to the hard disk drive unit HDD made up of the hard disk HD, slider SLID, magnetic head arm ARM1, voice coil motor VCM, and the like, as shown in FIG. 5.

A signal generator SG generates a servo track signal written in the hard disk. This servo track signal is written in the hard disk HDD through the magnetic head of the slider SLID.

A position detection unit NCPU is mounted on a support arm (rotating arm, positioner arm) ARM2. The distal end portion of an optical probe NCP is inserted into an elongated opening (not shown) of the base plate of the hard disk drive unit HDD and located near a side surface of the magnetic head arm ARM1. The support arm ARM2 is placed to be rotated about a rotating shaft coaxial with the rotation center O of the magnetic head arm ARM1. The rotation position of the position detection unit NCPU is detected by a high-resolution rotary encoder RE mounted on the rotating shaft O of the support arm ARM2. A signal processor SP1 rotatably drives a motor MO via a motor driver MD. The position detection unit NCPU is rotated/positioned by feedback control in this form.

Note that each of the motor MO, rotary encoder RE, motor driver MD, and signal processor SP1 is one element of the rotary positioner (positioner) RTP.

In this embodiment, the interferometer shown in FIG. 3 or 4 described above as the position detection unit NCPU is placed on the arm ARM2 of the rotary positioner RTP. Measurement light from this interferometer is incident on a side surface of the magnetic head arm ARM1 (corresponding to the object T). A light beam from this side surface is irradiated, and reflected light is extracted and brought to interference with another light beam, thereby making a signal processor SP2 measure a positional relationship with the magnetic head arm ARM1. With this operation, the relative distance between the side surface of the magnetic head arm ARM1 and the position detection unit NCPU of the rotary positioner RE is stably measured. The rotation motor (VCM) of the magnetic head arm ARM1 is controlled/driven by the voice coil motor driver (VCMD) so as to keep this measurement value constant.

With the arrangement described above, the magnetic head on the magnetic head arm ARM1 can be accurately positioned at a proper radial position on the hard disk, thus allowing a high-precision servo track write.

Although the above apparatus is a signal writing apparatus, the present invention can also be applied to a reading apparatus (e.g., an inspection apparatus) for reading a signal through a magnetic head or an apparatus having both functions.

What is claimed is:

1. An optical interference apparatus comprising:

a light source;

a beam splitter for splitting a light beam from said light source;

a reference surface by which one split light beam from said beam splitter is reflected to propagate backward through the optical path, the light beam from said reference surface and the other split light beam which emerges from said beam splitter, is reflected by an object to be detected, and returns, being combined by said beam splitter and the combined light being finally used as interference light, and the two split light beams emerging from said beam splitter as convergent light; and an optical element having a function of converging a light beam or changing a divergent state of the light beam, said optical element being inserted in an optical path of one of the split light beams emerging from said beam splitter, and the reflected light beams from converging positions of the two split light beams being combined at said beam splitter as spherical waves with curvatures equal to each other owing to an effect of said optical element.

2. An apparatus according to claim 1, wherein said optical element is inserted in an optical path extending to the object.

3. An apparatus according to claim 1, wherein said optical element comprises a lens.

4. An apparatus according to claim 1, wherein said optical element comprises a Fresnel lens.

5. An apparatus according to claim 1, wherein said optical element comprises a curved-surface mirror.

6. An apparatus according to claim 1, wherein the light beam transmitted through said beam splitter propagates toward said reference surface, and the light beam reflected from said beam splitter propagates toward the object via said optical element.

7. An apparatus according to claim 6, wherein an optical path of the light beam split by said beam splitter, which extends to said reference surface is set in a transparent member in which said beam splitter is formed.

8. A position detection apparatus for detecting a position relative to an object to be detected, comprising:

a light source;

a beam splitter for splitting a light beam from said light source;

a reference surface by which one split light beam from said beam splitter is reflected to propagate backward through the optical path, the light beam from said reference surface and the other split light beam which emerges from said beam splitter, is reflected by an object to be detected, and returns, being combined by said beam splitter and the two split light beams emerging from said beam splitter as convergent light;

a detection element for detecting the combined light beams while they are brought to interference with each other, a position relative to the object being detected on the basis of detection by said detection element; and an optical element having a function of converging a light beam or changing a divergent state of the light beam, said optical element being inserted in an optical path of one of the split light beams emerging from said beam splitter, and the light beams reflected from converging positions of the two split light beams being combined at said beam splitter as spherical waves with curvatures equal to each other owing to an effect of said optical element.

9. An apparatus according to claim 8, wherein said optical element is inserted in an optical path extending to the object.

10. An apparatus according to claim 8, wherein said optical element comprises a lens.

11. An apparatus according to claim 8, wherein said optical element comprises a Fresnel lens.

12. An apparatus according to claim 8, wherein said optical element comprises a curved-surface mirror.

13. An apparatus according to claim 8, wherein the light beam transmitted through said beam splitter propagates to said reference surface, and the light beam reflected from said beam splitter propagates to the object via said optical element.

14. An apparatus according to claim 13, wherein an optical path of the light beam split by said beam splitter, which extends to said reference surface is set in a transparent member in which said beam splitter is formed.

15. An information recording and/or reading apparatus comprising:

a signal system for recording and/or reading information on/from an information medium by using a head for recording and/or reading information;

position detection means for detecting a position of a member on which said head is provided, said position detection means including:

(1) a light source, (2) a beam splitter for splitting a light beam from said light source, (3) a reference surface by which one split light beam from said beam splitter is reflected to propagate backward through the optical path, the light beam from said reference surface and the other split light beam which emerges from said beam splitter, is reflected by said member on which said head is provided, and returns, being combined by said beam splitter and the two split light beams emerging from said beam splitter as convergent light, (4) a detection element for detecting the multiplexed light beams while they are brought to interference with each other, a position relative to said member on which said head is provided being detected on the basis of detection by said detection element, and (5) an optical element having a function of converging a light beam or changing a divergent state of the light beam, said optical element being disposed in an optical path of one of the split light beams emerging from said beam splitter, and the light beams reflected from converging positions of the two split light beams being combined at said beam splitter as spherical waves with curvatures equal to each other owing to an effect of said optical element; and a head position control system for controlling a position of said head on the basis of detection by said position detection means.

16. A method of producing an information medium comprising:

the step of recording and/or reading information on/from an information medium by using a head for recording and/or reading information;

the position detection step of detecting a position of a member on which the head is provided, the step including:

(1) the step of emitting light from a light source, (2) the step of splitting light beam from the light source by using a beam splitter, (3) the step of reflecting one split light beam from the beam splitter and making the light beam propagate backward through the optical path, combining the light beam from the reference surface with the other split light beam which emerges from the beam splitter, is reflected by the member on which the head is provided, and returns, and the two split light beams emerging from the beam splitter as convergent light, (4) the step of detecting the combined light beams while they are brought to interference with each other, a position relative to the member on which the head is provided being detected on the basis of the detection, and (5) the step of making one of the split light beams emerging from the beam splitter pass through an optical element having a function of converging a light beam or changing a divergent state of the light beam, the light beams reflected from converging positions of the two split light beams being combined at the beam splitter as spherical waves with curvatures equal to each other owing to an effect of the optical element; and the head position control step of controlling a position of the head on the basis of detection in the position detection step.

* * * * *